United States Patent

[11] 3,625,883

| [72] | Inventor | Joseph M. Valdespino<br>3609 Old Winter Garden Road, Orange County, Fla. 32805 |
|---|---|---|
| [21] | Appl. No. | 52,569 |
| [22] | Filed | July 6, 1970 |
| [45] | Patented | Dec. 7, 1971 |

[54] LIQUID WASTE TREATMENT PROCESS
9 Claims, 3 Drawing Figs.

[52] U.S. Cl............................................. 210/10,
110/8, 210/67, 210/73, 210/78, 210/259
[51] Int. Cl....................................................... C02c 1/24
[50] Field of Search............................................ 210/10, 15,
67, 73, 152, 78, 202, 62, 252, 290; 110/8, 14

[56] References Cited
UNITED STATES PATENTS

| 3,414,523 | 12/1968 | Jockel............................ | 210/61 X |
| 506,880 | 10/1893 | Jewell............................ | 210/67 |
| 2,058,026 | 10/1936 | McCallum..................... | 233/47 X |
| 2,151,079 | 3/1939 | Bowen........................... | 210/60 X |
| 2,948,677 | 8/1960 | Austin et al.................... | 210/44 |
| 3,276,994 | 10/1966 | Andrews........................ | 210/63 X |
| 3,376,833 | 4/1968 | Mutchler........................ | 110/14 |
| 3,462,275 | 8/1969 | Bellamy......................... | 210/15 X |
| 3,462,360 | 8/1969 | McKinney..................... | 210/14 X |
| 3,471,020 | 10/1969 | Wallace......................... | 210/152 |
| 3,511,380 | 5/1970 | Rice et al....................... | 210/202 |

Primary Examiner—Michael Rogers
Attorney—Duckworth and Hobby

ABSTRACT: An advanced liquid waste treatment process is provided for treating sewage and other liquid waste and having steps including centrifuging the waste through filter mediums to remove solids from the effluent both before and after lagooning the effluent to remove soluble phosphates, nitrates, and the like. The solids removed during the filtration are burned and the final effluent may be sterilized such as by the addition of chlorine.

Joseph M. Valdespino
INVENTOR

By Duckworth & Hobby

Attorney

LIQUID WASTE TREATMENT PROCESS

BACKGROUND OF THE INVENTION

The present invention relates to liquid waste disposal and more particularly to the process for treating sewage or other liquid waste in an efficient and economical manner, but resulting in an advance-treated effluent.

In the past waste disposal such as sewage has been by a primary treatment for removal of the grosser solids and then by a secondary treatment to further remove and to change the form of dissolved and colloidal organic matter to prevent odor and other nuisances.

Typically, raw sewage is screened to remove rags, pieces of wood and sizable material to prevent damage to pumps, and the like. Such screens are usually spaced bars with predetermined openings with provision for regular cleaning. Following the screening, materials such as sand and grit are removed to avoid wear on the pump surfaces. Grit may be separated by the regulation of velocity of flow so that fast settling grit will be deposited while the lighter solids will be carried on. The grit may be washed and used for fill dirt, and the like.

The next step is usually to remove suspended solids by sedimentation in tanks. This may be done very rapidly with a continuous flow of sewage into tanks designed to minimize currents that would interfere with sedimentation. The removed solids at this point must be disposed of which may be done by pumping to digesters, further drying, and burning in an incinerator. Cities on large rivers frequently end their treatment with the primary sedimentation and chlorination of the remaining effluent and discharge into the river. However, chemical coagulation to remove colloidal solids by coagulation of the solids into a size that will settle and then settling in a settling tank is usually desirable. This is performed by the addition of coagulative chemicals such as ferric chloride, ferrous sulfate or aluminum sulfate, and mixing such chemical with the effluent prior to the effluent entering a settling tank.

At this point the effluent contains a substantial amount of dissolved and colloidal matter that will decompose under the proper conditions. Secondary treatment generally utilizes one of the following methods: trickling filters, activated sludge or sand filters. Trickling filters are beds of 2–4 inch stones, or the like, in which the effluent is applied, such as in a spray. Purification results from the action of a film of bacterial slime on the stones. Following the filtration, the effluent is resettled.

Sand filters utilize beds of fine sand to pass the effluent through, and must be backwashed periodically. The activated sludge method is accomplished by mixing biologically active sludge to the effluent and agitating with a supply of air for aeration. The effluent is then allowed to settle. Other methods becoming more common include anaerobic digestion, and lagooning. Lagooning uses large holding basins and digestion may be accomplished aerobically or anaerobically such as by decomposing the waste material by anaerobic biological degradation. Aerobic treatment uses aerobic bacteria in the presence of dissolved molecular oxygen.

Advanced waste treatment processes have been suggested and these include absorption techniques such as passing the effluent over activated carbon, ammonia stripping for removing ammoniacal compounds, biodentrification for removing nitrates, and biological phosphate removal for removal of phosphates, removal of these last two nutrients being important in preventing contamination of surface water by excess growth of weeds and algae. These are in addition to the coagulation, disinfection, such as by chlorination, filtration, and the like, already mentioned.

The present invention, advantageously, takes a new approach for a "total advance" treatment system utilizing some presently known techniques but eliminating many of the commonly used steps in previous systems to provide economical and efficient waste treatment.

SUMMARY OF THE INVENTION

The present invention relates to a method for the advanced treatment of liquid waste and in particular to a method for treating sewage and industrial waste, and the like. The liquid waste is first fed to a comminutor for chopping and mixing the solid waste with the liquid to give a more homogeneous liquid waste which is then fed to a surging tank for providing an intermittent flow into a centrifuging step for centrifuging the waste through a filter medium such as sand, or diatomaceous earth for separating the solids from the liquid effluent. Burning of the separated solids may take place within or without the centrifuging filter and the separated effluent fed to an oxidation lagoon for aerobic biological degradation of solids in the waste which reduces the biological oxygen demand of the effluent. The generation of algae through photosynthesis or plant growth may also be provided in the lagoon to remove phosphates, nitrates and other nutrients. Effluent containing algae, microbiological agents, and the like, from he lagoon is fed to a second centrifuge filter for filtering the effluent through a filter medium to separate the remaining solids from the effluent, and the remaining solids are burned and the separated effluent discharged. The effluent may then be sterilized, such as by chlorination, and the ash in each centrifuge removed.

BRIEF DESCRIPTION OF THE DRAWINGS

Other objects, features and advantages of this invention will be apparent from a study of the written description and the drawings in which.

DESCRIPTION OF THE PREFERRED EMBODIMENT

Figure 1:
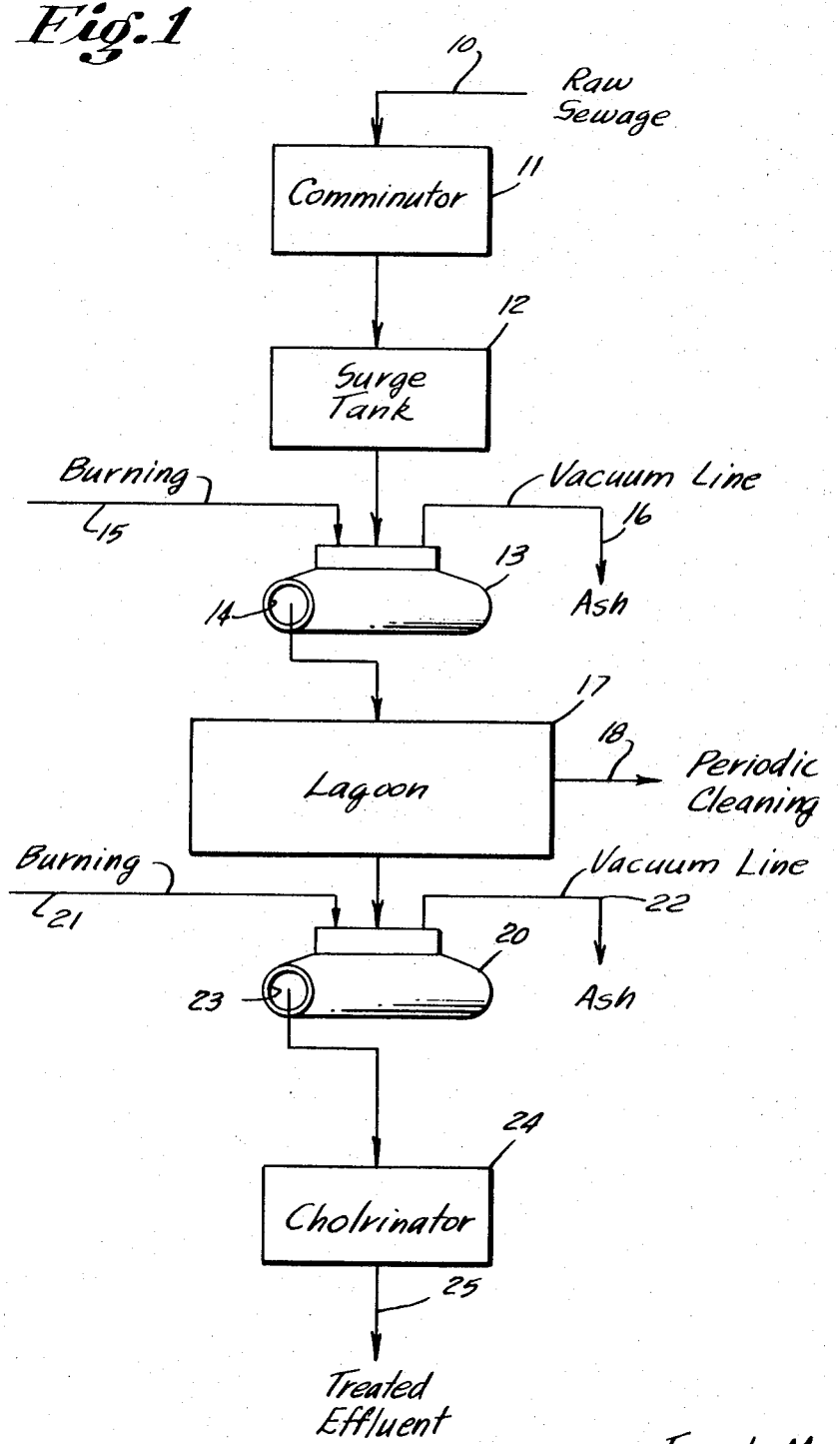
FIG. 1 is a flow diagram of one embodiment of the present process.

Referring now to FIG. 1, a flow diagram of the preferred process is illustrated in which an input at 10 of raw sewage is fed to a comminutor 11 which comminutor chops up solids in the incoming sewage into a more homogeneous mixture of the solids and liquids in the liquid waste being treated. Following comminution the resulting sewage is fed to a surge tank 12 which surge tank provides intermittent flow to the centrifuge and filter 13. Surge tank 12 is a holding tank that holds the incoming raw sewage from the comminutor 11, and feeds it in batches to the filter 13. Filter 13 is a centrifuge-filter-pump combination that will be described in more detail in connection with FIGS. 2 and 3 and is used to separate solids from a liquid effluent, the liquid effluent leaving at 14, whereas the solids are trapped by a filter medium located around the periphery of the rotating centrifuge drum. The centrifuge provides the necessary force to the liquid waste to force the liquids through the filter medium and through perforations in the side of the drum. Inside the rotating drum there is provided a burner burning the dried material captured by the filter which has an input 15 which may be gas for a gas burner or electricity for electrical arc burner or any other type of burning device desired, without departing form the spirit and scope of the present invention. Surge tank 12 provides intermittent flow so that at predetermined intervals the flow may be stopped from entering the filter centrifuge 13 and the solids captured along the filter material and dried by the continuous rotation of the centrifuge drums so that it may be more easily burned within the filter drum. The ash remaining after the burning of the organic materials may then be vacuumed out as shown by vacuum line 16 and the ash may be disposed of by burial or by any other means desired. The effluent leaving the filter 13 at 14 is pumped into a lagoon 17 for the removal of soluble pollutants and to improve the biological oxygen demand (BOD) of the effluent.

It will be clear that while a substantial portion of the solids have been removed by the filter system 13, soluble pollutants and nutrients, such as nitrates and phosphates, and the like, will pass through the filter 13 to the lagoon 17. The lagoon is then utilized to oxidize and to degrade these pollutants, to reduce the biological oxygen demand and to remove the nutrients in the effluent. Thus, the system here could be a continuous aeration and one effective means for removing nutrients has been by the continuous growth of vegetation in the lagoon, in addition to the normal microbiological activity therein. This vegetation can typically be a unicellular algae which removes the nitrates and phosphates from the effluent, and of recent it has also been shown that certain weeds found in Florida waterways are also effective at utilizing nutrients such as nitrates and phosphates while removing them from the effluent. Such vegetation would require periodic cleaning by the removal at 18 of the vegetation. This vegetation of course has substantial amounts of protein and other valuable organic materials which can be utilized in animal feeds, fertilizers, and the like, if desired and may of course be burned or otherwise disposed of.

The effluent is removed on an intermittent basis from the lagoon or from several lagoons as desired into a second centrifuge-filter-pump combination 20 which filter 20 operates in a similar manner to the filter 13 except that a finer filter may be desired in the second filtration because of the smaller amount and size of the solids remaining in the effluent. The effluent at this point may contain algae, microbiological agents such as bacteria, and the like, which solids are removed. The flow is pumped from the lagoon into the filter 20 on an intermittent basis to accomplish the burning with an input at 21 and the vacuuming of the ash with an output at 22 similar to that provided and described for filter 13, and as will be described in more detail in connection with FIGS. 2 and 3. The output of the effluent at 23 will be a clear, advance-treated effluent with reduced biological oxygen demand and will be fed to chlorinator 24, which while shown as a chlorinator could of course be any other type of sterilizer desired, to provide the final sterilization for the treated effluent which is then discharged at 25. Discharged effluent can be fed back into water sources, aquifers or utilized in irrigation or pretty much as desired because of its advanced treatment providing an output of a quality normally found only in tertiary or advance treatment systems, while at the same time altering and eliminating portions of the typical primary-secondary-tertiary treatment steps found in most advanced treatment systems.

Figure 2:
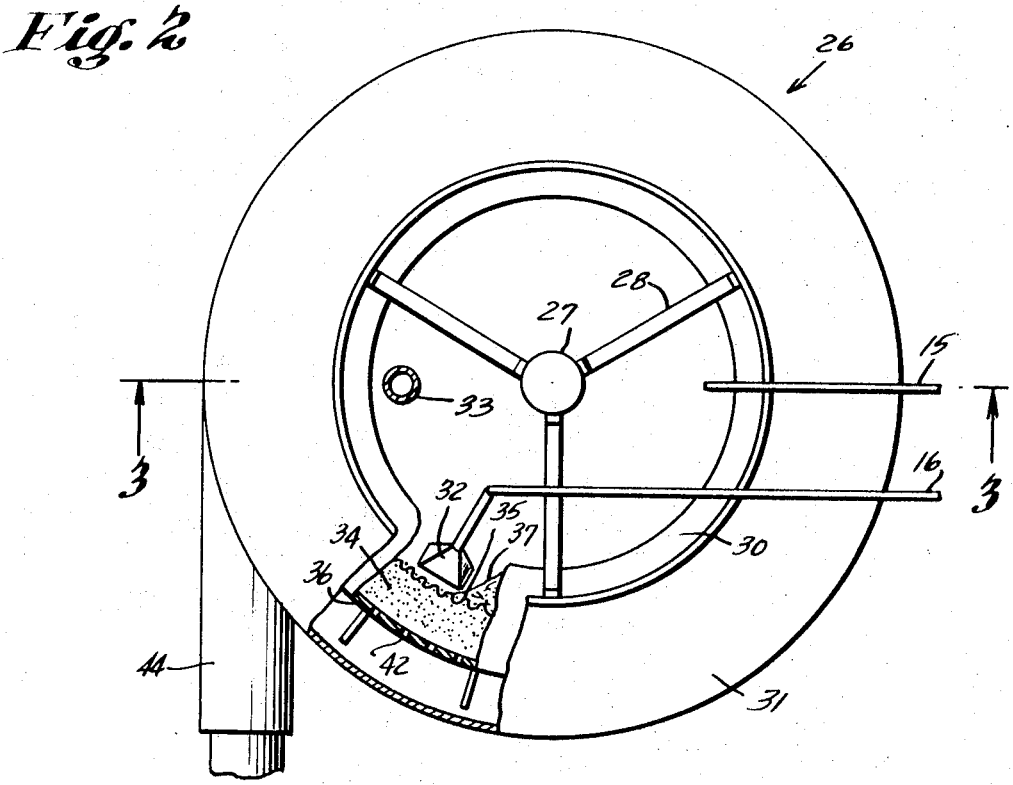
FIG. 2 is a top sectional view of the centrifuge, filter and burning unit of the present invention.
Figure 3:
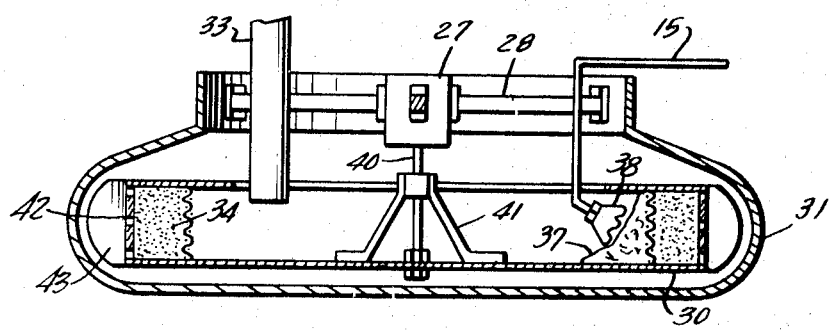
FIG. 3 is a view taken along line 3—3 of FIG. 2.

Turning now to FIG. 2, a better view of the centrifuge filter 26 can be seen as utilized in steps 13 and 24 of FIGS. 1 and 2. Centrifuge 26 is driven by an electric motor 27 mounted on brackets 28 connected to a centrifuge drum 30 and having a casing 31. The input 15 for the burner can be seen as can the output 16 for the vacuum nozzle 32 and input pipe 33 feeds the liquid into the centrifuge drum 30 which is rotated by the motor 27 to apply a g. force to force the liquids through a filter medium 34 such as sand or diatamaceous earth or other filtering materials as desired. The filtering material is advantageously held around the periphery of the drum 30 by a screen 35 and a perforated outer portion of the drum 36. The filter medium traps the solid materials 37 which are burned by the burner 38 and the ash vacuumed in the proper sequence. Motor 27 can be seen having a shaft 40 and centrifuge drum brackets 41 for supporting and rotating the drum 30. Perforations 42 may be seen in the outer portion of the rotating drum as can vanes 43 which cooperate with he specially shaped casing 31 to operate the filter and centrifuge as a centrifugal pump pumping the filtered effluent out of the exit pipe 44. Thus, at intervals, the effluent entering at 33 will be shut off so that the solids 37 may be dried by the rotation of the centrifuge filter, burned with the burner 38 and the ash vacuumed with vacuum nozzle 32 for removal out the vacuum pipe 16. The present system advantageously combines a centrifuge for producing the necessary force for filtering the liquid through the filter medium 34 with the filter and acting as a centrifuge pump, thus eliminating the necessity of having separate filter and pumps while producing a very rapid and effective filtration of the liquid along with a system for intermittently drying the solids for burning. It will of course be clear that the solids could be removed from the filter prior to burning and burned separately or disposed of in another manner, if desired, even if this would require additional apparatus or a separate burner, scraper and conveying means for removing the solids prior to burning, without departing from the spirit and scope of the present invention.

At this point it will be clear to those skilled in the art that a liquid waste treatment process has been described for an advanced treatment of liquid waste, but variations and equivalents are anticipated as being within the spirit and scope of the present invention. For instance, a chlorination sterilizer has been suggested but it will be clear that other types of sterilizers can be used and that the filter medium can be varied as desired. Accordingly, the present invention is not to be construed as limited to the particular forms disclosed herein since these are to be regarded as illustrative rather than constructive.

I claim:

1. A liquid waster treatment process comprising the steps of: centrifuging said liquid waste through a filter medium in a centrifuge to separate solids therefrom; removing said separated solids from said centrifuge and lagooning the remaining effluent in at least one lagoon; centrifuging effluent from said lagoon through a filter medium in a centrifuge to separate solids from said effluent, burning and removing said separated solids from said centrifuge and discharging said separated effluent.

2. The method of treating liquid waste in accordance with claim 1 but including the step of sterilizing said effluent prior to discharging said effluent.

3. The method of treating liquid waste in accordance with claim 2 in which the step of sterilizing is by chlorination.

4. The process in accordance with claim 3, but including the step of comminuting said liquid waste prior to said first centrifuging to produce a generally homogeneous liquid waste.

5. The process in accordance with claim 4 in which said comminuted liquid waste is held in a holding tank means for feeding said waste into said first centrifuging step.

6. The process in accordance with claim 5 but including the step of removing ash for disposal following each step of burning solids.

7. The process in accordance with claim 6 but including the step of periodic removal of vegetation from said lagoon.

8. The method in accordance with claim 7 in which said steps of burning take place in centrifuges used for centrifuging said liquid waste through said filter medium.

9. The method in accordance with claim 8 in which said steps of centrifuging include pumping said effluent by the action of the centrifuge.

* * * * *